United States Patent
Sahm

(10) Patent No.: US 8,549,720 B2
(45) Date of Patent: Oct. 8, 2013

(54) TOOL REVOLVER UNIT FOR A MACHINE TOOL

(75) Inventor: Detlef Sahm, Lichtenwald (DE)

(73) Assignee: Sauter Feinmechanik GmbH, Metzingen (DE)

( * ) Notice: Subject to any disclaimer, the term of this patent is extended or adjusted under 35 U.S.C. 154(b) by 734 days.

(21) Appl. No.: 12/452,752

(22) PCT Filed: Jul. 4, 2008

(86) PCT No.: PCT/EP2008/005472
§ 371 (c)(1),
(2), (4) Date: Feb. 16, 2010

(87) PCT Pub. No.: WO2009/012875
PCT Pub. Date: Jan. 29, 2009

(65) Prior Publication Data
US 2010/0139065 A1    Jun. 10, 2010

(30) Foreign Application Priority Data
Jul. 26, 2007   (DE) .......................... 10 2007 035 030

(51) Int. Cl.
*B23B 3/16* (2006.01)
*B23B 3/18* (2006.01)
*B23B 3/20* (2006.01)

(52) U.S. Cl.
USPC ............... 29/48.5 A; 29/40; 29/49; 74/813 L; 74/822; 82/120; 82/121

(58) Field of Classification Search
USPC ....... 74/813 L, 813 R, 816, 822; 82/120, 121; 29/40, 39, 48.5 R, 48.5 A, 49

IPC ......................................... B23B 3/16, 3/18, 3/20
See application file for complete search history.

(56) References Cited

U.S. PATENT DOCUMENTS

| 3,618,426 | A |   | 11/1971 | Fisher |  |
|---|---|---|---|---|---|
| 4,038,891 | A | * | 8/1977 | Zaninelli | 82/159 |
| 4,202,227 | A | * | 5/1980 | Thumm | 82/159 |
| 4,468,991 | A | * | 9/1984 | Reusch et al. | 82/159 |
| 4,972,744 | A | * | 11/1990 | Sauter et al. | 82/159 |
| 5,787,767 | A | * | 8/1998 | De Bernardi | 74/813 L |
| 6,276,035 | B1 | * | 8/2001 | Hessbruggen et al. | 29/40 |
| 6,609,441 | B1 | * | 8/2003 | Sugimoto et al. | 74/813 L |
| 7,784,162 | B2 | * | 8/2010 | Hessbruggen et al. | 29/27 C |

FOREIGN PATENT DOCUMENTS

| DE | 31 53 388 C2 | 6/1982 |
|---|---|---|
| DE | 32 16 994 A1 | 11/1983 |
| DE | 81 25 706 U1 | 7/1984 |
| DE | 39 13 139 C2 | 11/1989 |
| DE | 38 40 242 C2 | 12/1989 |

(Continued)

*Primary Examiner* — David Bryant
*Assistant Examiner* — Jason L Vaughan
(74) *Attorney, Agent, or Firm* — Roylance, Abrams, Berdo and Goodman LLP

(57) ABSTRACT

A tool revolver unit for a machine tool for machining workpieces has a housing (1) and a tool drive rotatable relative to the housing about an axis (3), has a rotary drive (13, 15) for a rotational motion of the tool disk, and has another rotary drive (19, 23). The other rotary drive (19, 23) is a servomotor for controlling a locking device (5, 31, 37) enabling a releasable rotary lock between the housing (3) and the tool disk.

14 Claims, 4 Drawing Sheets

(56) References Cited

FOREIGN PATENT DOCUMENTS

| | | |
|---|---|---|
| DE | 103 33 414 A1 | 2/2005 |
| DE | 10 2005 021 202 B3 | 8/2006 |
| EP | 0 343 334 A2 | 11/1989 |
| EP | 0 597 413 A1 | 5/1994 |
| FR | 2 030 654 | 11/1970 |
| FR | 2 441 452 A1 | 6/1980 |
| WO | WO 01/83162 A1 | 11/2001 |

* cited by examiner

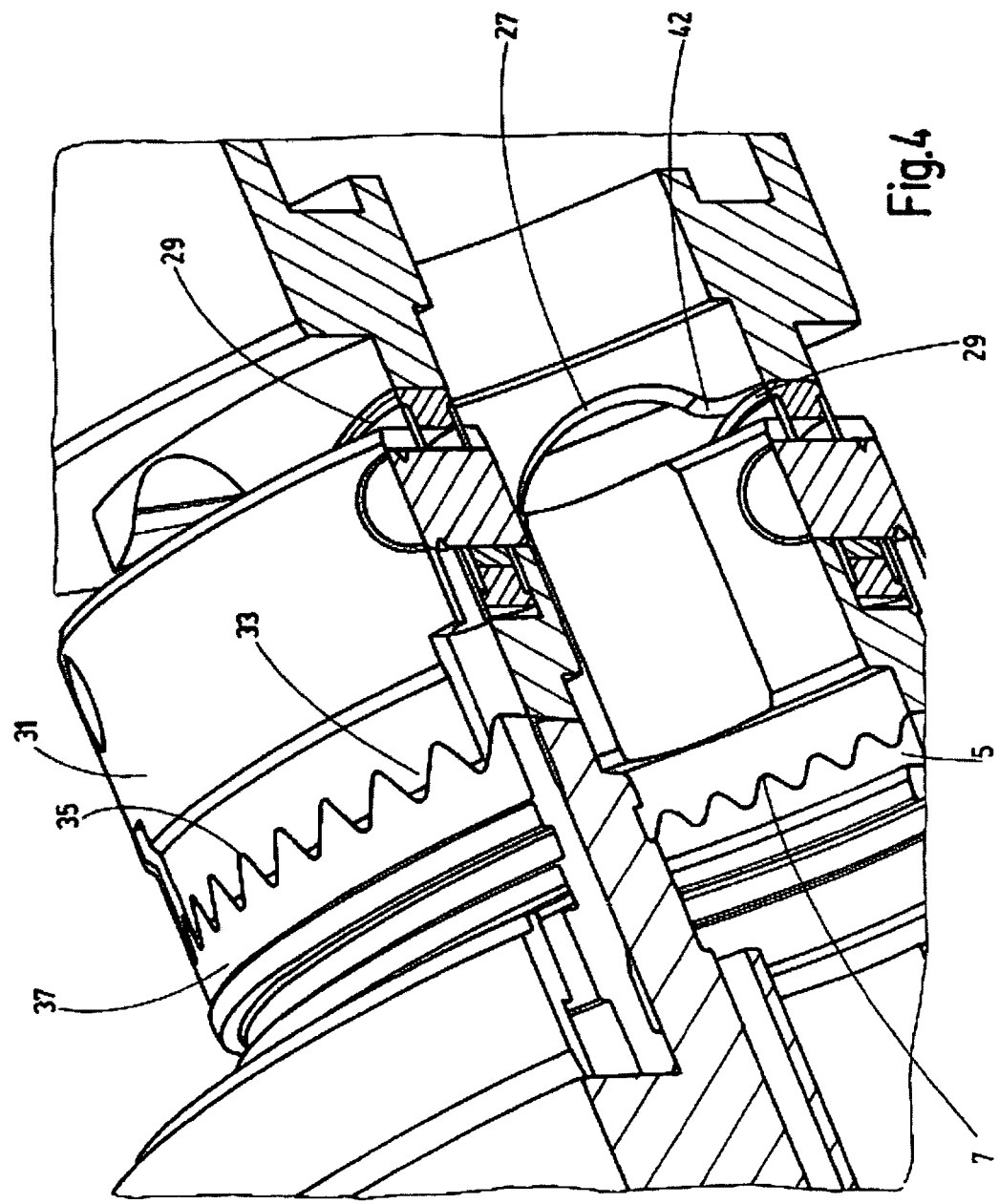

TOOL REVOLVER UNIT FOR A MACHINE TOOL

FIELD OF THE INVENTION

The invention relates to a tool revolver unit for a machine tool for machining workpieces. The unit has a housing and a tool disk that can rotate around an axis relative to this housing, a rotary drive for rotation of the tool disk and another rotary drive.

BACKGROUND OF THE INVENTION

A tool revolver unit of this type is already known from document DE 10 2005 021 202 B3. In this known solution, a rotary drive drives the tool disk via a rotating element of the revolver to place the tool disk in a rotational position that is provided for machining with a respective machining tool arranged at the tool disk. The additional rotary drive makes it possible to drive via a shaft a rotating tool optionally attached to the tool disk.

During the operation of such tool revolver units, especially when turning operations are performed with a tool that is rigidly attached to the tool disk, high stresses occur with correspondingly high torques. These torques attempt to rotate the tool disk out of the required position. To ensure a high-grade machining, special measures are then necessary to permit a reliable immobilization of the tool disk in the required rotational position.

In the above-mentioned known solution, a brake assembly that can be activated hydraulically is provided for this purpose. This brake assembly produces a holding torque on a brake disk by pressing a brake lining. When high stresses occur, this brake assembly ensures secure holding in position of the tool disk.

To this end, it is already known, in the case of movable units of similar type that carry machining tools, to ensure the positional immobilization of the component that carries the tool by a positive locking engagement of locking elements that are equipped with a Hirth coupling.

Such immobilizing devices can also then be activated hydraulically, see, for example, document DE 39 13 139 C2.

The use of a catch via elements equipped with a Hirth coupling avoids the drawbacks that exist in the above-mentioned known solution by inadequate holding torques of the brake assembly. In the known solutions with fluid-activated toothed elements with Hirth couplings, however, the drawbacks of high cost and large space requirement for pressurized spaces, fluid lines, fluid connections, etc., have to be accepted.

SUMMARY OF THE INVENTION

An object of the invention is to provide an improved tool revolver unit that, with an especially compact design, simultaneously ensures an especially secure positional immobilization of the tool disk, even when high stresses occur.

According to the invention, this object is basically achieved by a tool revolver unit where an additional rotary drive is present in addition to the rotary drive that is used in the positioning of the tool disk and is used as a servomotor of a locking device for the releasable rotary lock between the housing and the tool disk. Instead of a brake assembly, a locking device for the tool disk is provided which, on the one hand, affords the advantage that in comparison to a location fixation by a holding torque produced by a brake assembly, perfect positional fixing in the locking state is achieved. On the other hand, the motorized activation of the locking device permits an essentially simplified and extremely compact design, compared to conventional, fluid-activated locking devices.

The two rotary drives can be electric-motor drives of rotors and stators.

In an especially advantageous way, both rotary drives are external rotor motors, whose rotors are arranged concentrically to one another and to the axis of rotation of the tool disk. This coaxial arrangement, relative to the axis of the rotation of the tool disk, not only opens up the possibility of an especially simple direct drive of the tool disk by the rotor of the pertinent external rotor motor undergoing transition directly into a drive shaft of the tool shaft, but also permits an especially slim configuration of the housing.

When using electric motor drives with a rotor and stator, a sensor-free positional determination of the rotor can be provided conventionally, for example, with use of control devices and methods of the type that disclosed in, for example, document DE 103 33 414 A1. No additional space is required within the housing. Rather, the control device connected via an interface to the machine control can be mounted outside of the housing and connected to the pertinent external rotor motor in the housing only via three-phase connecting cables.

The locking device that can be activated by the additional rotary drive used as a servomotor preferably has toothed elements with a Hirth coupling. The toothed elements can be brought in and out of toothed engagement with each other by relative movements carried out in the axial direction. Especially secure rotational locking can then be achieved by being in toothed engagement, as is also the case in conventional, fluid-activated securing devices with Hirth couplings.

In an especially advantageous way, the rotary drive used here as a servomotor of the locking device is connected to a control gear that transforms the rotation produced by the servomotor into an axial displacement of a toothed element equipped with a Hirth coupling.

The control gear can have a cam ring with a control curve that is connected to the rotor of the associated rotary drive and is mounted rotatably and axially immovably in the housing. During rotation, an axial stroke of the movable toothed element of the locking device guided thereon can be produced via said control curve.

In especially advantageous embodiments, which are distinguished by an especially compact design, the control curve forms a track that is concentric to the shaft. On this track are guided rollers of the axially movable toothed element that forms a locking ring. The rollers form cam sensing devices.

Preferably, there is a prestressing device on the locking ring that holds the rollers in contact with the control curve of the cam ring by friction. The prestressing device prestresses the locking ring for an axial movement that extends from the locking position into the unlocking position of the locking device. The locking device is thus designed mechanically resettable.

In an especially simple and advantageous way, the prestressing device can have at least one compression spring arrangement that, extending through the Hirth coupling of the locking ring, is clamped between the locking ring and a corresponding axial and movable toothed element of the locking device, and produces the axial prestressing of the locking ring.

The locking device can be configured so that in addition to the locking ring, there are two toothed elements, specifically a rotatable ring that forms the actual revolver rotating element that is connected to the tool disk as well as a ring that is integral with the housing and that surrounds the housing on the outer peripheral side. The Hirth couplings are in each case in a radial plane and can engage with the Hirth coupling of the locking ring.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure:

FIG. 4 is a partial perspective view of the locking device showing the operating state of the locked locking device.

DETAILED DESCRIPTION OF THE INVENTION

Figure 1:
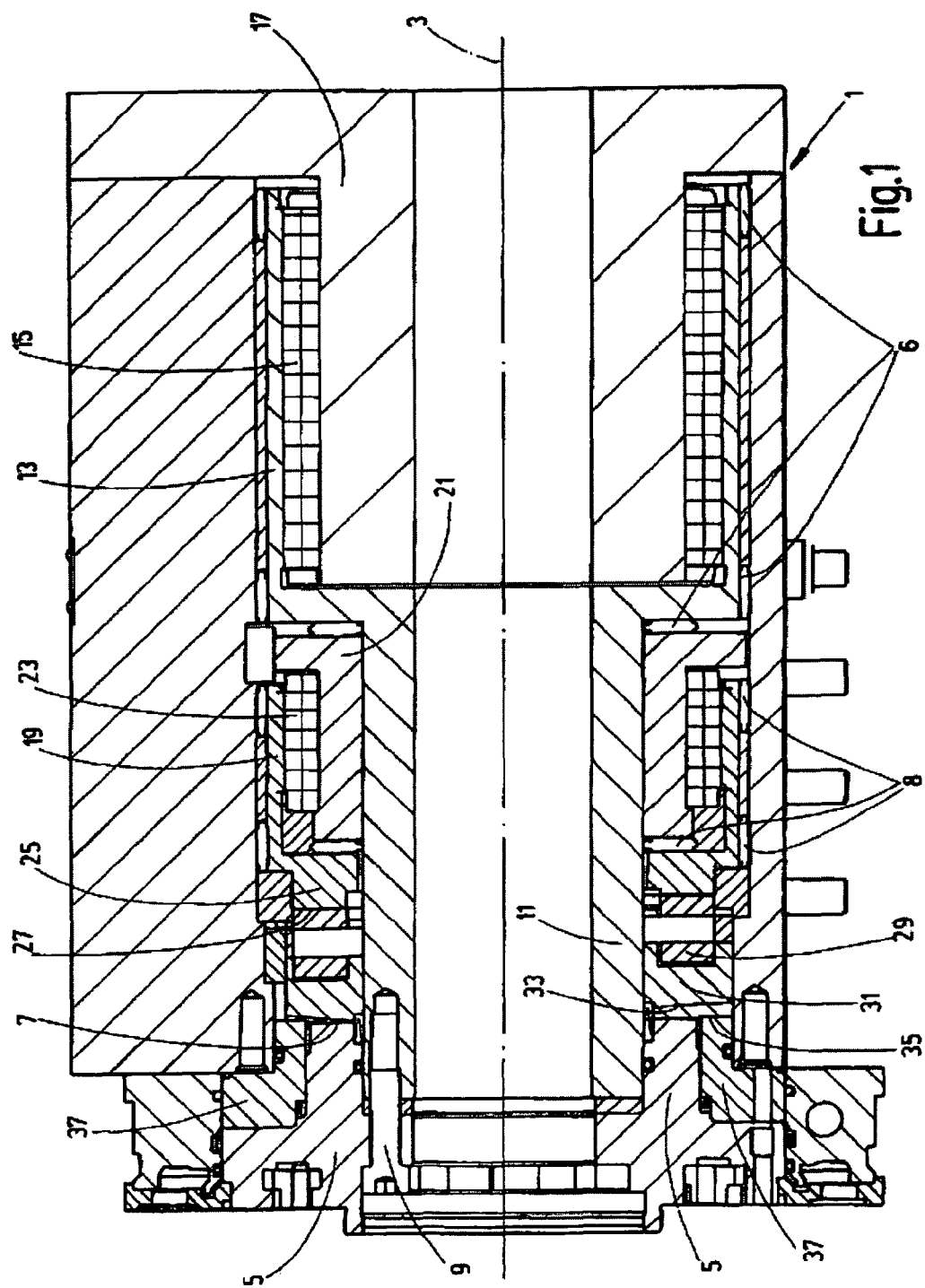
FIG. 1 is a diagrammatically simplified side elevational view in section of the housing of a tool revolver unit according to an exemplary embodiment of the invention, the operating state in which the locking device for rotary locking of the tool disk in the locking position shown in the part located above the longitudinal shaft in the drawing, while the operating state of the unlocking position of the locking device is shown in the drawing part located below the longitudinal shaft.

The exemplary embodiment shown in diagrammatic form in longitudinal section in FIG. 1 has a more or less cuboid-shaped housing 1, whose longitudinal shaft or axis 3, which is positioned eccentrically, forms the axis of rotation for a front-side toothed element 5. The outside of element 5 forms the receiver for an adjustable tool disk (not shown) at desired rotational positions. The toothed element 5 is a ring element that is mounted to rotate in the housing 1 and that is provided on its end that is inside the housing with a Hirth coupling 7 that is concentric to the shaft 3. The toothed element 5 is screw connected, only one screw 9 being shown, to a hollow shaft 11 so as to be able to rotate. The bell-shaped end section of the hollow shaft forms the rotor 13 for an external rotor motor that is concentric to the shaft 3. The motor stator 15 is immobilized on an engine bracket 17, which is located on the rear end area of the housing 1. The stator 15 can be supplied with current by a conventional position-regulating device (not shown) to adjust the toothed element 5 in selected rotational positions via the hollow shaft 11, positions in which the tool disk that is fastened to the toothed element 5 occupies the rotational position that is provided for the desired machining process.

Coaxially to the external rotor motor that is formed from rotor 13 and stator 15, there is a second rotary drive that is coaxial and concentric to the axis of rotation 3, which secondary rotary drive is closer to the front side, i.e., the toothed element 5. The second rotary device is also an external rotor motor with a second rotor 19 that is concentric to the axis of rotation and that surrounds a second stator 23 like a bell that is immobilized on a carrier 21 that is integral with the housing. On its end section that faces the toothed element 5, the rotor 19 undergoes transition into a cam ring 25, which has a shaped piece on its end facing the toothed element 5, and forms the control curves 27, whose cam profile makes it possible to produce an axial stroke from cam sensing devices guided on the control curves 27, in which there are rollers 29. Further details of this cam control are specified below with reference to the FIGS. 2 and 4. The cam ring 25 in interaction with the rollers 29 form a control gear, by which, based on a rotation of the rotor 19 and thus the cam ring 25, an axial displacement of a locking ring 31 that is concentric to the hollow shaft 11 can be produced, on which the rollers 29 are mounted. This locking ring 31 has a Hirth coupling 33 on its end that faces the Hirth coupling 7 on the toothed element 5, which is in engagement with the Hirth coupling 7 at the toothed element 5 in the axial position, which forms the locking position, shown in FIG. 1 above the shaft 3.

In this locking position, the Hirth coupling 33 of the locking ring 31 is not only in engagement with the Hirth coupling 7 at the toothed element 5, but simultaneously with a Hirth coupling 35 that is concentric thereto at another toothed element 37. Toothed element 37 is screwed tightly to the housing 1 and forms a ring element that is L-shaped in cross-section. In this locking position that is shown above in FIG. 1, positive locking is thus formed by the locking ring 31 between the toothed element 37 that is integral with the housing and the toothed element 5 that can be rotated with the tool disk. In the unlocking position shown below in FIG. 1, the Hirth couplings 7, 33, and 35 are not engaged, so that a rotation of the toothed element 5 that is produced by the external rotor motor 13, 15 and thus of the tool disk can take place.

Figure 2:
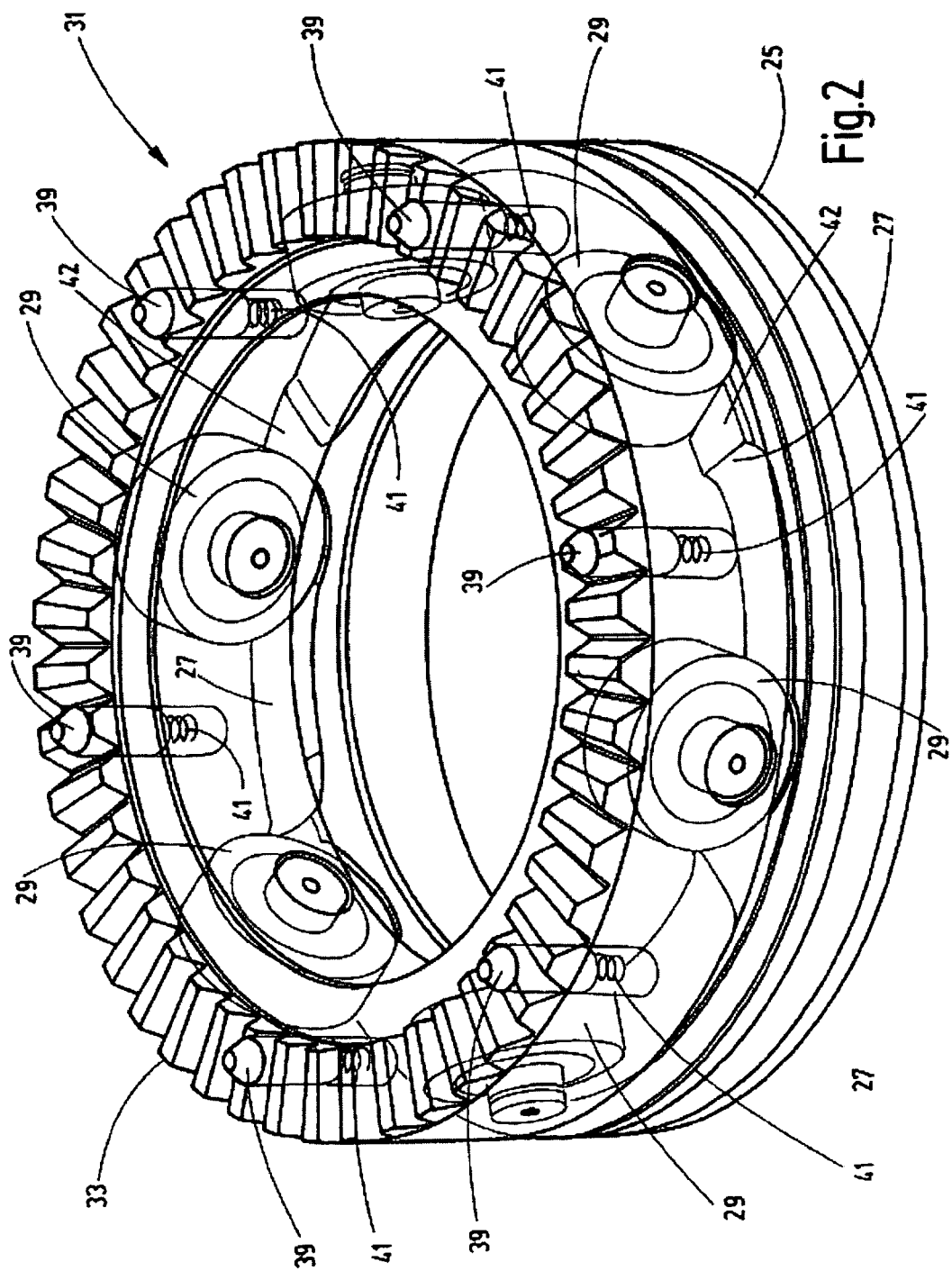
FIG. 2 is a perspective view, enlarged compared to FIG. 1, of only one locking ring of the locking device of FIG. 1.

In an enlarged view, FIG. 2 shows details of the locking ring 31 with the rollers 29 that are mounted to rotate on it, of the front-side Hirth coupling 33 as well as of the control curves 27 on the cam ring 25 that is shown only partially. As can also be seen from FIG. 2, the locking ring 31 is provided with a prestressing device, which holds the rollers 29 by friction adjoining the corresponding control curves 27 and attempts to push the Hirth coupling 33 out of engagement with the Hirth couplings 7 and 35 of the toothed elements 5 or 37. As is to be seen, this prestressing device has axially movable compression pieces 39 that, extending through the Hirth coupling 33, are prestressed by compression springs 41 and are supported against the Hirth coupling 35 of the toothed element 37. As a result, the locking ring 31 comes into the unlocking position when a back rotation of the cam ring 25 is carried out, for example by supplying current to the stator 23 of the external rotor motor 19, 23.

Figure 3:
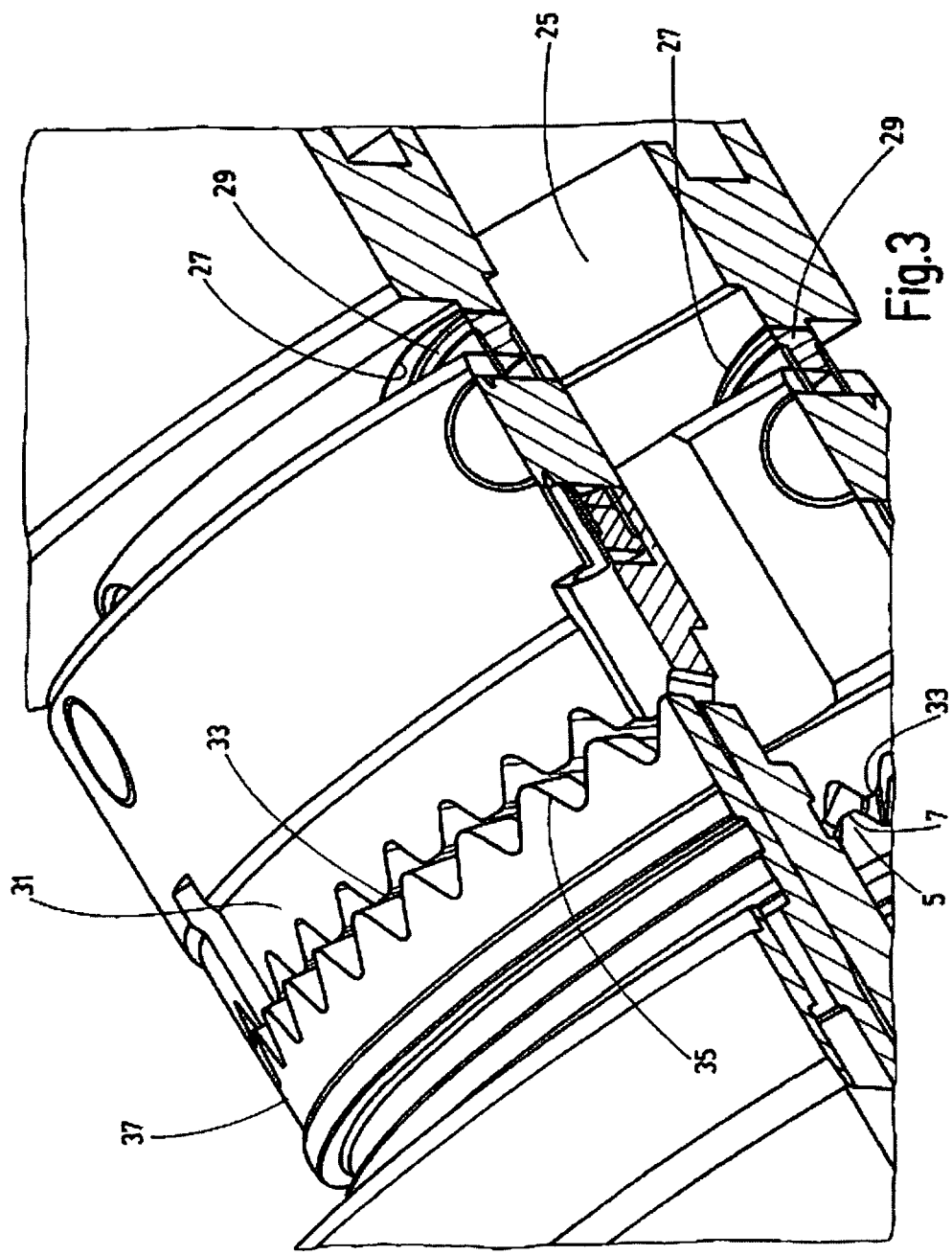
FIG. 3 is a perspective partial view, on an enlarged scale compared to FIG. 2, of only a partial area of the locking device of FIG. 1 in the angle cut view, showing the operating state of the unlocked locking device.

FIGS. 3 and 4 illustrate the positions of the toothed elements 5, 31 and 37, which form the locking device, relative to each other. FIG. 3 shows the unlocking position, in which the rollers 29 are located in the deeper areas of the control curves 27, so that the Hirth coupling 33 of the locking ring 31 is both out of engagement with the Hirth coupling 35 in the toothed element 37 that is integral with the housing and out of engagement with the Hirth coupling 7 at the rotatable toothed element 5.

In comparison, in the locking position shown in FIG. 4, the rollers 29 have run up onto the elevated curve areas 42 of the control curves 27 so that the Hirth coupling 33 of the locking ring 31 is in engagement with both with the Hirth coupling 35 of the stationary toothed element 37 and with the Hirth coupling 7 at the rotatable toothed element 5. As FIGS. 3 and 4 also illustrate, the tooth shapes of the interacting Hirth couplings 7, 33 and 35 are selected such that, when they are in engagement, the toothing generate torques producing an alignment, and thus smooth toothed engagement is ensured.

As can be seen from FIG. 1, the hollow shaft 11 is in the area in which it forms the rotor 13 of the rotary drive for the adjustment of the tool disk, mounted in the housing 1 via roller bearing 6. The rotor 19 and the cam ring 25 of the locking device that is connected to the cam ring are mounted to rotate via roller bearing 8.

While one embodiment has been chosen to illustrate the invention, it will be understood by those skilled in the art that various changes and modifications can be made therein without departing from the scope of the invention as defined in the appended claims.

What is claimed is:

1. A tool revolver unit for a machine tool for machining workpieces, comprising:
    a housing having an axis;
    a tool disk coupled to said housing to rotate about said axis relative to said housing;
    a locking device in said housing movable between locking and unlocking positions locking and unlocking said tool disk to prevent and allow rotation of said tool disk relative to said housing, respectively; and
    first and second rotary drives mounted in said housing, said first rotary drive coupled to said tool disk for rotation of said tool disk, said second rotary drive including a servomotor moving said locking device between the locking and unlocking positions, each of said rotary drives being an electric-motor drive with a motor and a stator, said rotary drives being external rotor motors with said rotors thereof arranged concentrically to one another and to said axis.

2. A tool revolver unit according to claim 1 wherein said locking device comprises toothed elements with Hirth couplings, said toothed elements being relatively movable along said axis into and out of engagement with one another.

3. A tool revolver unit according to claim 2 wherein said second rotary device is connected to a control gear transforming rotation produced by said servomotor into axial displacement by an axially movable toothed element of said toothed elements.

4. A tool revolver unit according to claim 3 wherein said control gear comprises a cam ring with a control curve connected to said rotor of said second rotary drive and mounted rotatably movable and axially immovable in said housing, said movable toothed element being guided on said control curve during rotation of said cam ring to move along an axial stroke.

5. A tool revolver unit according to claim 4 wherein said control curve comprising a track concentric to said axis, guide rollers on said axially movable toothed element being on said track and forming a locking ring, said rollers forming cam sensing devices.

6. A tool revolver unit according to claim 5 wherein a prestressing device on said locking ring holds said rollers by friction in contact with said control curve, and
    said prestressing device biases said locking ring for axial movement away from the locking position and toward the unlocking position.

7. A tool revolver unit according to claim 6 wherein said prestressing device comprises at least one compression spring arrangement extending through said Hirth coupling of said locking ring, is clamped between said locking ring and a mating axially immovable toothed element of said toothed elements of said locking device, and biases said locking ring.

8. A tool revolver unit according to claim 7 wherein said locking device comprises a ring element rotatable with said tool disk and forming a first toothed element of said toothed elements of said locking device and a ring element surrounding said first toothed element having an outer periphery side being integral with said housing and forming a second toothed element of said toothed elements of said locking device, said Hirth couplings of said first and second toothed elements lying in a common plane extending radially to said axis and being engageable with said Hirth coupling of said locking ring.

9. A tool revolver unit for a machine tool for machining workpieces, comprising:
    a housing having an axis;
    a tool disk coupled to said housing to rotate about said axis relative to said housing;
    a locking device in said housing movable between locking and unlocking positions locking and unlocking said tool disk to prevent and allow rotation of said tool disk relative to said housing, respectively;
    first and second rotary drives mounted in said housing, said first rotary drive coupled to said tool disk for rotation of said tool disk, said second rotary drive including a servomotor moving said locking device between the locking and unlocking positions;
    said locking device including toothed elements with Hirth couplings, said toothed elements being relatively movable along said axis into and out of engagement with one another;
    said second rotary device being connected to a control gear transforming rotation produced by said servomotor into axial displacement by an axially movable toothed element of said toothed element;
    said control gear including a cam ring with a control curve connected to said rotor of said second rotary drive and mounted rotatably movable and axially immovable in said housing, said movable toothed element being guided on said control curve during rotation of said cam ring to move along an axial stroke;
    said control curve including a track concentric to said axis, guide rollers on said axially movable toothed element being on said track and forming a locking ring, said rollers forming cam sensing devices;
    a prestressing device on said locking ring holding said rollers by friction in contact with said control curve; and
    said prestressing device biasing said locking ring for axial movement away from the locking position and toward the unlocking position.

10. A tool revolver unit according to claim 9 wherein each of said first and second rotary drives comprises an electric-motor drive with a rotor and a stator.

11. A tool revolver unit according to claim 9 wherein said prestressing device comprises at least one compression spring arrangement extending through said Hirth coupling of said locking ring, is clamped between said locking ring and a mating axially immovable toothed element of said toothed elements of said locking device, and biases said locking ring.

12. A tool revolver unit according to claim 11 wherein said locking device comprises a ring element rotatable with said tool disk and forming a first toothed element of said toothed elements of said locking device and a ring element surrounding said first toothed element having an outer periphery side being integral with said housing and forming a second toothed element of said toothed elements of said locking device, said Hirth couplings of said first and second toothed elements lying in a common plane extending radially to said axis and being engageable with said Hirth coupling of said locking ring.

13. A tool revolver unit according to claim 12 wherein each of said first and second rotary drives comprises an electric-motor drive with a rotor and a stator.

14. A tool revolver unit according to claim 11 wherein each of said first and second rotary drives comprises an electric-motor drive with a rotor and a stator.

* * * * *